United States Patent
Liu et al.

(10) Patent No.: US 12,533,949 B2
(45) Date of Patent: Jan. 27, 2026

(54) TOUCH DETECTION CIRCUIT AND DENOISING CIRCUIT THEREOF

(71) Applicant: PIXART IMAGING INC., Hsin-Chu County (TW)

(72) Inventors: Shiue-Shin Liu, Hsin-Chu County (TW); Chang-Yuan Liou, Hsin-Chu County (TW); Cheng-Chih Chang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 240 days.

(21) Appl. No.: 18/349,966

(22) Filed: Jul. 11, 2023

(65) Prior Publication Data

US 2025/0018790 A1 Jan. 16, 2025

(51) Int. Cl.
*B60K 35/10* (2024.01)
*G06F 3/01* (2006.01)
*B60K 35/60* (2024.01)

(52) U.S. Cl.
CPC .............. *B60K 35/10* (2024.01); *G06F 3/011* (2013.01); *B60K 35/60* (2024.01); *B60K 2360/143* (2024.01); *B60K 2360/46* (2024.01); *B60K 2360/48* (2024.01); *B60K 2360/782* (2024.01)

(58) Field of Classification Search
CPC ........ B60K 35/00; B60K 35/10; B60K 35/60; B60K 2360/143; B60K 2360/46; B60K 2360/48; B60K 2360/782; G06F 3/011; G06F 3/03547; G06F 3/0383; H03K 17/962; H03K 2217/96071; H03K 2217/960755
See application file for complete search history.

(56) References Cited

U.S. PATENT DOCUMENTS

| | | | |
|---|---|---|---|
| 2004/0183787 A1* | 9/2004 | Geaghan | G06F 3/0445 345/173 |
| 2011/0242050 A1* | 10/2011 | Byun | G06F 3/0443 345/174 |
| 2014/0240278 A1* | 8/2014 | Kim | H03F 1/14 330/252 |
| 2017/0305376 A1* | 10/2017 | Lamesch | H03K 17/955 |
| 2020/0004400 A1* | 1/2020 | Muguruma | G06F 3/04182 |

(Continued)

FOREIGN PATENT DOCUMENTS

| | | | | |
|---|---|---|---|---|
| CN | 109419320 A | * | 3/2019 | ............ A47J 27/002 |
| EP | 2595461 A1 | * | 5/2013 | ........... H01R 12/515 |
| KR | 20210012132 A | * | 2/2021 | |

OTHER PUBLICATIONS

Unpublished U.S. Appl. No. 17/949,232, Titled Hod Device and Vehicle Control Device, filed Sep. 21, 2022; 23 pgs.

*Primary Examiner* — Temesghen Ghebretinsae
*Assistant Examiner* — Karin Kiyabu
(74) *Attorney, Agent, or Firm* — HAUPTMAN HAM, LLP

(57) ABSTRACT

There is provided a denoising circuit connecting to two pins of a chip. The denoising circuit includes a shielding branch, a driving branch and an intermediate capacitor. The shielding branch is connected between a first pin of the chip, a ground voltage and a shielding metal. The driving branch is connected between a second pin of the chip and a load. The intermediate capacitor is connected between the shielding branch and the driving branch. The first pin and the second pin are used to respectively output a sinusoidal signal.

20 Claims, 4 Drawing Sheets

(56) References Cited

U.S. PATENT DOCUMENTS

| | | | |
|---|---|---|---|
| 2021/0191571 A1* | 6/2021 | Lee | G06F 3/0446 |
| 2021/0255730 A1* | 8/2021 | Gray | G01V 3/08 |
| 2022/0004757 A1* | 1/2022 | Ikeda | G06F 3/044 |
| 2022/0404932 A1* | 12/2022 | Gray | G06F 3/0416 |
| 2024/0086016 A1* | 3/2024 | Seo | G06F 3/044 |

* cited by examiner

TOUCH DETECTION CIRCUIT AND DENOISING CIRCUIT THEREOF

FIELD OF THE DISCLOSURE

This disclosure generally relates to a touch detection circuit and, more particularly, to a touch detection circuit that is equipped with an active denoising circuit to reduce or even eliminate the noise interference in detecting a touch event and a denoising circuit thereof.

BACKGROUND OF THE DISCLOSURE

By measuring a capacitance variation using a capacitive detection device, it is able to identify whether a user is in contact with the capacitive detection device and to perform corresponding controls on an electronic device employing the capacitive detection device.

However, when the capacitance variation is not large enough, the detection result can be changed due to noises existing in the system such that an error identification can occur.

Therefore, how to eliminate the noise interference is one of the issues in capacitive detection devices.

SUMMARY

Accordingly, the present disclosure provides a touch detection circuit that is equipped with an active denoising circuit to reduce or even eliminate the noise interference and a denoising circuit thereof.

The present disclosure provides a touch detection circuit and a denoising circuit thereof in which a driving trace arranged between the denoising circuit and a load is surrounded by a shielding metal to which a sinusoidal signal is provided.

The present disclosure provides a touch detection circuit and a denoising circuit thereof in which no inductance element is arranged.

The present disclosure provides a denoising circuit for being connected between two pins of a chip and a load. The denoising circuit includes a first resistor, a first capacitor, a second resistor, a second capacitor, a third resistor, a third capacitor and a shielding metal. The first resistor is connected between a first pin of the chip and a first node. The first capacitor is connected between the first node and a ground voltage. The second resistor is connected between a second pin of the chip and a second node. The second capacitor is connected between the first node and the second node. The third resistor is connected to the second node. The third capacitor is connected between the third resistor and a driving trace, wherein the driving trace is configured to be connected to the load. The shielding metal is surrounding the driving trace.

The present disclosure further provides a touch detection circuit for detecting an impedance variation of a load. The touch detection circuit includes a chip and a denoising circuit. The chip includes a first pin and a second pin. The denoising circuit includes a first resistor, a first capacitor, a second resistor, a second capacitor, a third resistor, a third capacitor and a shielding metal. The first resistor is connected between the first pin of the chip and a first node. The first capacitor is connected between the first node and a ground voltage. The second resistor is connected between the second pin of the chip and a second node. The second capacitor is connected between the first node and the second node. The third resistor is connected to the second node. The third capacitor is connected between the third resistor and a driving trace, wherein the driving trace is configured to be connected to the load. The shielding metal is surrounding the driving trace.

The present disclosure further provides a touch detection circuit for detecting an impedance variation of a load. The touch detection circuit includes a chip, a shielding metal, a shielding branch, a driving branch and an intermediate capacitor. The chip includes a first pin and a second pin respectively configured to output a sinusoidal signal. The shielding branch is connected between the first pin, a ground voltage and the shielding metal, and configured to direct noises to the ground voltage. The driving branch is connected between the second pin and the load. The intermediate capacitor is connected between the shielding branch and the driving branch.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a denoising circuit in which a driving trace 23 thereof is surrounded by an active shielding metal 24, and to provide a touch detection circuit using the same. The denoising circuit includes a denoising capacitor C1 for directing noises to a ground voltage to reduce the interference to a read signal, e.g., Io mentioned below. The denoising circuit further includes a current limiting resistor R1 for reducing the current flowing into a signal source.

Figure 1:
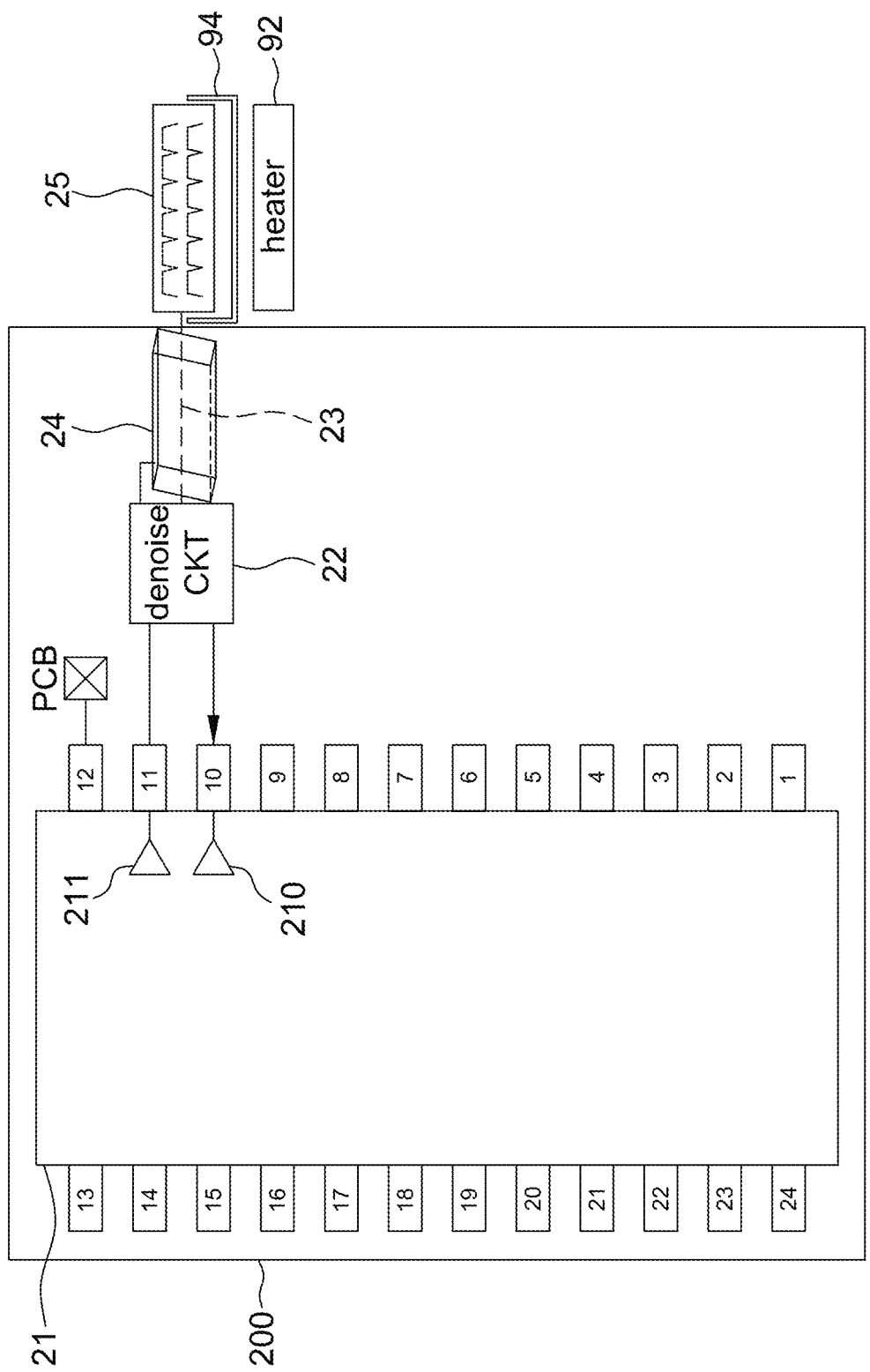
FIG. 1 is a schematic block diagram of a touch detection circuit according to one embodiment of the present disclosure.

The touch detection circuit of the present disclosure is connected to a device having at least one conductive region 25 (as shown in FIG. 1) that is operated (i.e. touched) or is not operated (i.e. untouched) by a user. In one example, said device is a vehicle steering wheel. Operations of other components (e.g., a heater 92 as shown in FIG. 1) in the vehicle steering wheel can introduce noises to the conductive region 25. Traditionally, a metal 94 (used as a shielding component) is inserted between the conductive region(s) 25 and a noise source (i.e. the heater 92) to block noises therefrom. Since the touch detection circuit of the present disclosure has the denoising function, the denoising circuit can direct noises caused by the noise source in the vehicle steering wheel to ground via the denoising capacitor C1 to further reduce the noise interference. That is, the denoising circuit of the present disclosure is able to direct noises interfering detection signals on a driving trace 23 and a conductive region 25 to ground.

Please refer to FIG. 1, it is a schematic block diagram of a touch detection circuit according to one embodiment of the present disclosure. The touch detection circuit includes a chip 21, a denoising circuit (shown as denoise CKT for abbreviation) 22, a driving trace 23 and a shielding metal 24 arranged on a circuit board 200. The touch detection circuit detects an impedance variation of a load (e.g., a conductive region) 25 to identify whether the load 25 is touched by a user or not, i.e. the impedance being changed due to the touch. The circuit board 200 is, for example, a printed circuit board (PCB) or a flexible circuit board without particular limitations.

Figure 4:
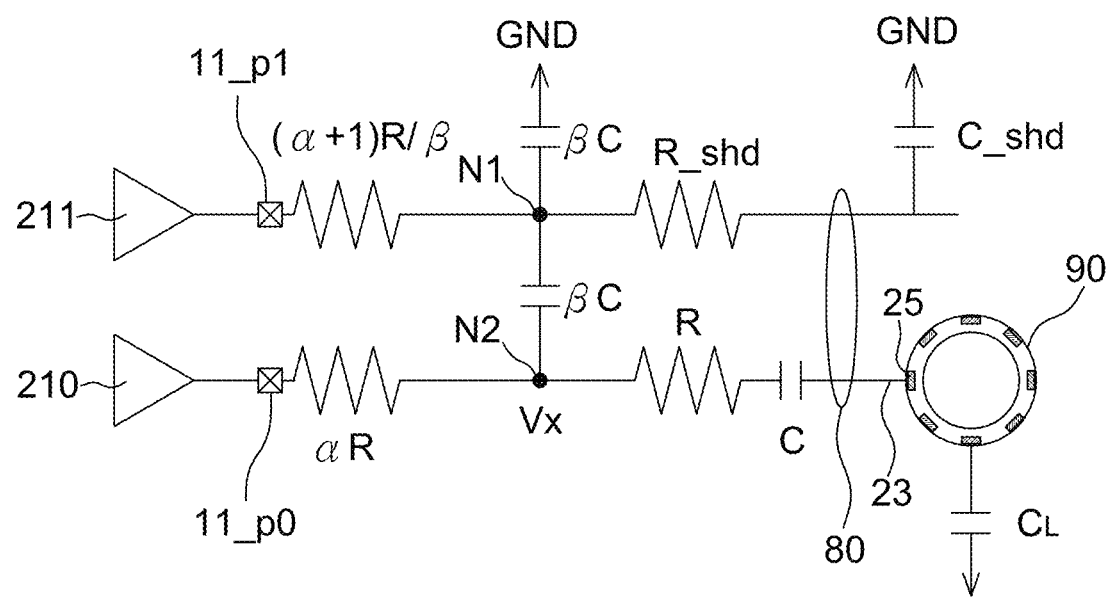
FIG. 4 is an equivalent circuit diagram of a denoising circuit and a shielding metal of the present disclosure connected to a load.

Before shipment, the circuit board 200 carrying the chip 21, the denoising circuit 22, the driving trace 23 and the shielding metal 24 are formed as a module or a package, which has a contact for being connected to the load 25. In the case that the circuit board 200 is connected to a vehicle steering wheel 90 as shown in FIG. 4, the vehicle steering wheel 90 has at least one conductive region 25 (e.g., eight rectangles filled with slant lines being shown, but not limited to eight conductive regions) for being touched by a user. Therefore, the touch detection circuit of the present disclosure has at least one driving trace 23 respectively connected to the at least one conductive region 25. In an aspect that the denoising circuit 22 is connected to multiple conductive regions 25 (each being shielded by one metal 94) via multiple driving traces 23, the multiple driving traces 23 are surrounded by one shielding metal 24 surrounding all the multiple driving traces 23. In another aspect, each of the multiple driving traces 23 is surrounded by a corresponding shielding metal 24, i.e. multiple shielding metals 24 being arranged in the touch detection circuit of the present disclosure.

Details of arranging the conductive region 25 on a vehicle steering wheel may be referred to U.S. patent application Ser. No. 17/949,232, entitled "HOD DEVICE AND VEHICLE CONTROL DEVICE" filed on Sep. 21, 2022, assigned to the same assignee of the present application, and the full disclosure of which is incorporated herein by reference, and thus details thereof are not described herein.

The load 25 is formed as, for example, an electrode on a vehicle steering wheel, a capacitive touch pad of computers or other electronic devices capable of identifying a user's touch event by detecting the impedance variation.

The chip 21 transmits a driving signal to the load 25 via the denoising circuit 22 and the driving trace 23, and reads, for example, but not limited to, a current Io from the denoising circuit 22. The chip 21, more specifically a processor (e.g., an application specific integrated circuit, a field programmable gate array or the like) therein, calculates a variation of the current Io (or a voltage, a time interval of charging or discharging a capacitor) to identify whether the load 25 is touched by the user or not. The method of a capacitive touch detection device for detecting a touch according to the capacitance variation is known to the art and not a main objective of the present disclosure, and thus details thereof are not described herein.

FIG. 1 shows that the chip 21 includes 24 pins (or pads), a first signal source 211 and a second signal source 210. The first signal source 211 includes, for example, an operational amplifier to output a first signal to the denoising circuit 22 via a pin 11. The second signal source 210 includes, for example, another operational amplifier to output a second signal to the denoising circuit 22 via a pin 10. In one aspect, the first signal and the second signal are identical sinusoidal signals (e.g., shown as Isin in FIG. 2) having a frequency fi. Said "identical" herein is referred to having the same frequency, amplitude and phase. FIG. 1 further shows that the chip 21 is connected to the circuit board (shown as PCB) 200 via a pin 22, but not limited to connecting via the pin 22.

It should be mentioned that the chip 21 is not limited to having 24 pins, and the first signal source 211 and the second signal source 210 are not limited to connecting to the pin 11 and pin 10, respectively. When the first signal source 211 and the second signal source 210 respectively provide a driving signal (e.g., Isin) to another two pins of the chip 21, the denoising circuit 22 is connected to said another two pins.

That is, in the present disclosure a type of the chip 21 is not particularly limited as long as the chip 21 has two pins/pads for being connected to the denoising circuit 22.

Figure 2:
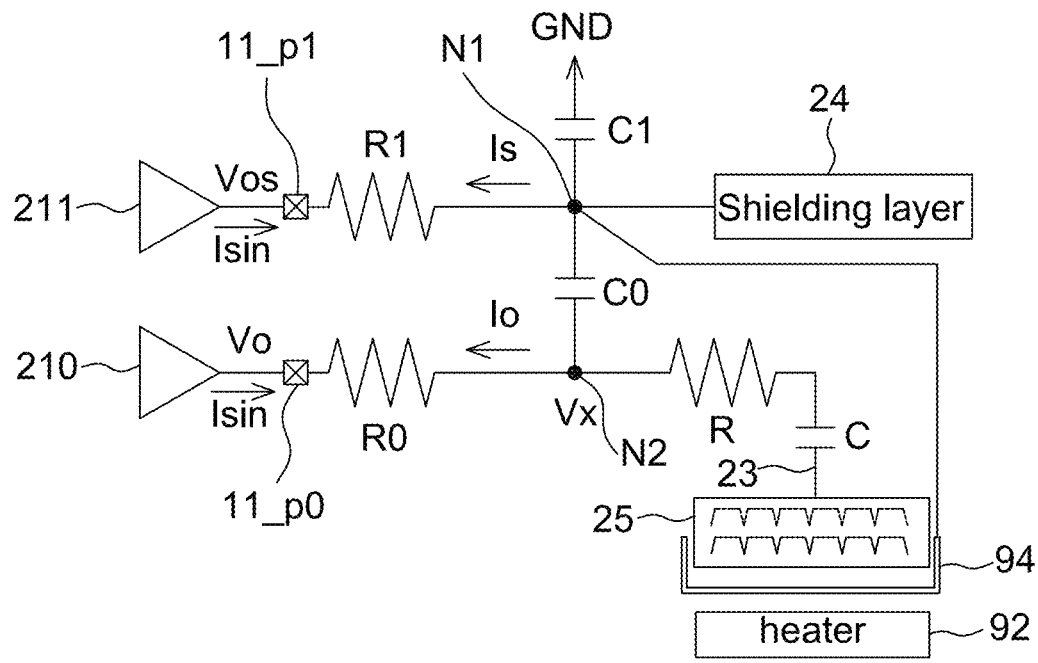
FIG. 2 is a circuit diagram of a denoising circuit according to one embodiment of the present disclosure.

Please refer to FIG. 2, it is a circuit diagram of a denoising circuit 22 according to one embodiment of the present disclosure. The denoising circuit 22 is connected between two pins of the chip 21 and the load 25 so as to lower circuit noises and the current Is thereby improving the identification accuracy of a touch event and lowering the loading of first signal source 211.

The denoising circuit 22 includes a shielding branch, a driving branch, a shielding metal 24 and an intermediate capacitor C0 connected between the shielding branch and the driving branch. The shielding branch is connected between a first pin 11_p1 of the chip 21 (e.g., the pin 11 in FIG. 1, but not limited to), a ground voltage GND and the shielding metal 24. The driving branch is connected between a second pin 11_p0 of the chip 21 (e.g., the pin 10 in FIG. 1, but not limited to) and the load 25. One end of the shielding metal 24 is connected to the shielding branch.

More specifically, the shielding branch includes a first resistor R1 and a first capacitor C1. The driving branch includes a second resistor R0, a second capacitor C0, a third resistor R, a third capacitor C and a driving trace 23. The capacitors C, C0 and C1 are not stray capacitors of the circuit line but real capacitor components.

Figure 3:
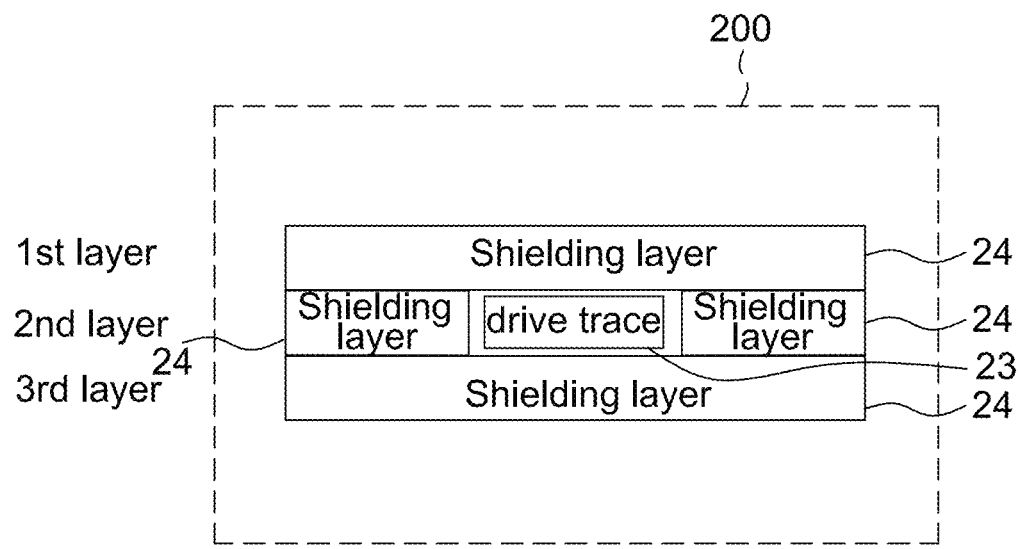
FIG. 3 is a cross sectional view of arranging multiple layers of shielding metal in a circuit board of a touch detection circuit according to one embodiment of the present disclosure.

Please refer to FIGS. 1 and 3, the shielding metal (shown as shielding layer for illustration purposes) 24 surrounds the driving trace (shown as drive trace for abbreviation) 23 in a length direction of the driving trace 23 to shield noises. As shown in FIG. 1, the shielding metal 24 is a hollow rectangular cylinder with the driving trace 23 extending therein. In one aspect, the shielding metal 24 has multiple layers respectively arranged in different layers of the circuit board 200, e.g., a first layer, a second layer and a third layer shown in FIG. 3, and the shielding metal 24 in the multiple layers are connected to one another to have the same potential. Preferably, the shielding metal 24 surrounds the driving trace 23 and extends to a connecting point (or the contact of the module/package) of the load 25 so as to fully cover the driving trace 23, but the shielding metal 24 is electrically separated from the load 25. In one aspect, the shielding metal 24 arranged in different layers of the circuit board 200 respectively has a rectangular cross section as shown in FIG. 3, but the present disclosure is not limited to rectangular shape. The shielding metal 24 and the driving trace 23 are formed by, e.g., exposure development process. In another aspect, the shielding metal 24 is a hollow circular cylinder or has other cross sectional shape without particular limitations.

Please refer to FIG. 2 again, the first resistor R1 is connected between a first pin 11_p1 of the chip 21 and a first node N1. The first capacitor C1 is connected between the first node N1 and a ground voltage GND. The second resistor R0 is connected between a second pin 11_p0 of the chip 21 and a second node N2. The second capacitor C0 is connected between the first node N1 and the second node N2. The third resistor R is connected to the second node N2. The third capacitor C is connected between the third resistor R and the driving trace 23, wherein the driving trace 23 is used to be connected to the load 25. One end of the shielding metal 24 is connected to the first node N1, and the other end thereof is connected to the ground voltage GND via C_shd as shown in FIG. 4.

The first resistor R1 is used to match phases of the driving signals Isin on the shielding branch and the driving branch to improve stability. The first capacitor C1 is used to direct noises to the ground voltage GND to achieve the effect of absorbing/attenuating noises. The second resistor R0 is used to form a current low pass filter to limit noises. The second capacitor C0 is used to absorb/attenuate noise current to the operational amplifier or the ground voltage GND. The third resistor R and the third capacitor C are used to form a voltage low pass filter to limit noises.

Please refer to FIG. 4, it is an equivalent circuit diagram of the denoising circuit 22 connected to one load 25 (each load 25 connecting to one driving trace 23, some driving traces being omitted to simplify the drawing), which has a load capacitor CL. In addition, FIG. 4 shows the equivalent resistor R_shd and the equivalent ground capacitor C_shd of the shielding metal 24. In FIG. 4, the reference numeral 80 indicates that the shielding metal 24 is surrounding outside of the driving trace 23.

Figure 5:
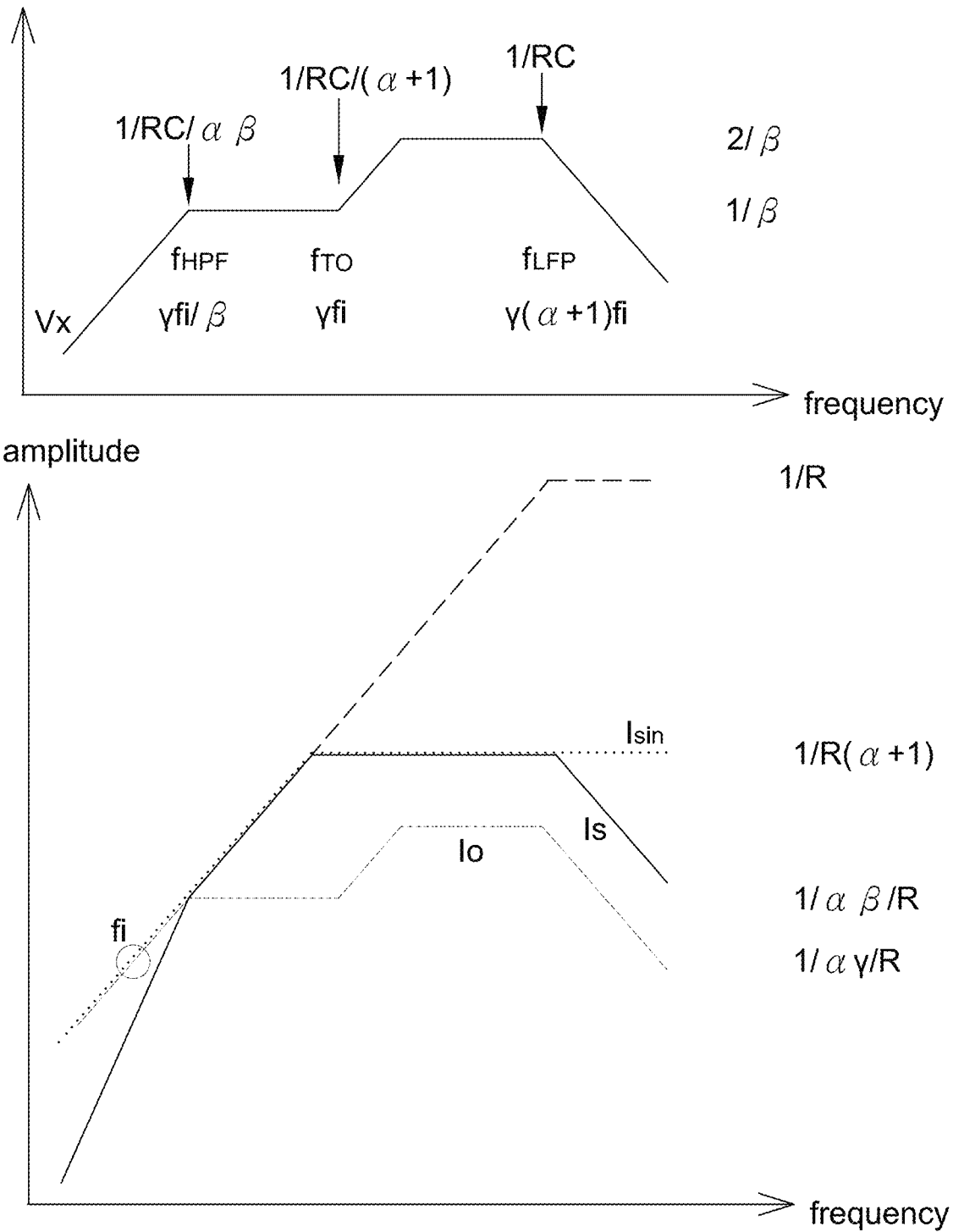
FIG. 5 is a schematic diagram of the node voltage and line currents of a denoising circuit according to one embodiment of the present disclosure.

Please refer to FIGS. 2, 4 and 5, FIG. 5 shows the frequency response of a voltage Vx at the second node N2, and variations of currents Is, Io and Isin. After the system frequency (i.e. an operating frequency of touch detection circuit) is determined, a low pass frequency $f_{LPF}$ is determined at first and values of the third resistor R and the third capacitor C are then determined, wherein $f_{LPF}=1/2\pi RC$. A transition frequency $f_{TO}$ is determined according to a frequency fi of the driving signal Isin. After the third resistor R and the third capacitor C are determined, a value of a is determined according to the transition frequency $f_{TO}$, wherein $f_{TO}=1/2\pi(\alpha+1)RC$. Finally, a high pass frequency $f_{HPF}$ is determined according to the system frequency, and a value of β is determined in conjunction with the determined R, C and a, wherein $f_{HPF}=1/2\pi\alpha\beta RC$. In the present disclosure, α and β are positive values.

In the present disclosure, the R, C, α and β are determined according to a frequency of the sinusoidal signal Isin and noise frequencies (it is able to obtain noise frequency range by previously measurement). In addition, in the case that the load 25 has a load capacitor CL, the load capacitor CL is also considered in determining values of the third resistor R and the third capacitor C. In other words, the R, C, α and β are further determined according to the load capacitor CL of the load 25.

After the R, C, α and β are determined, the first resistor R1 is selected as $(\alpha+1)R/\beta$, the second resistor is selected as αR, the first capacitor C1 and the second capacitor C2 are selected as βC, e.g., as shown in FIG. 4.

As shown in FIG. 5, by arranging the first capacitor C1, the frequency response of the voltage Vx between the transition frequency $f_{TO}$ and the low pass frequency $f_{LPF}$ is doubled, e.g., shown from 1/β to 2/β. Meanwhile, by arranging the first resistor R1, the current Is flowing into the first signal source 211 is reduced by (α+1) times, e.g., shown from 1/R to 1/R (α+1) so as to reducing the loading of operational amplifier of the first signal source 211.

In addition, the current Io flowing into the second signal source 210 has a variation corresponding to the frequency response variation of the voltage Vx. In the present disclosure, it is set γfi=1/2π(α+1) RC, and 1/αγ/R indicates a current of the driving signal Isin at the frequency fi.

In the present disclosure, the chip 21 (more specifically a processor therein) identifies whether the load 25 is touched by a user or not according to the variation of current Io. In one aspect, the chip 21 includes a trans-impedance amplifier (TIA) to convert the current Io to a voltage. Then an anti-alias filter (AAF) is used to filter the voltage. The filtered voltage is converted to a digital value using an analog-to-digital converter (ADC), and the variation of the digital value is calculated to identify whether a touch event occurs or not, e.g., by comparing with a predetermined threshold.

As mentioned above, it is known that a capacitive detection device is easily interfered by noises such that the detection accuracy is degraded. Accordingly, the present disclosure further provides a touch detection circuit (e.g., referring to FIG. 1) and a denoising circuit thereof (e.g., referring to FIG. 2) that provide a driving signal to a shielding metal through a shielding branch to achieve the effect of active shielding. The shielding branch includes a denoising capacitor for directing noises to a ground voltage such that the noises do not enter a chip. The shielding branch further includes a current limiting resistor to reduce the loading of a signal source.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A denoising circuit, connecting between two pins of a chip and a load, the denoising circuit comprising:
    a first resistor, connected between a first pin of the chip and a first node;
    a first capacitor, connected between the first node and a ground voltage;
    a second resistor, connected between a second pin of the chip and a second node;
    a second capacitor, connected between the first node and the second node;
    a third resistor, connected to the second node;
    a third capacitor, connected between the third resistor and a driving trace, wherein the driving trace is configured to be connected to the load, which is configured to be touched by a user; and
    a shielding metal, surrounding the driving trace but not surrounding the load.

2. The denoising circuit as claimed in claim 1, wherein the denoising circuit and the driving trace are arranged on a circuit board, and
    the shielding metal is arranged in different layers of the circuit board, and surrounding the driving trace in a length direction of the driving trace to the load.

3. The denoising circuit as claimed in claim 2, wherein one end of the shielding metal is connected to the first node.

4. The denoising circuit as claimed in claim 2 wherein the shielding metal arranged in the different layers of the circuit board respectively has a rectangular cross section.

5. The denoising circuit as claimed in claim 1, wherein the load is an electrode of a vehicle steering wheel or a capacitive touch pad of a computer.

6. The denoising circuit as claimed in claim 1, wherein
the third resistor has a resistance of R,
the third capacitor has a capacitance of C,
the first resistor has a resistance of $(\alpha+1)R/\beta$,
the first capacitor and the second capacitor respectively has a capacitance of $\beta C$,
the second resistor has a resistance of $\alpha R$, and
the $\alpha$ and the $\beta$ are positive values.

7. The denoising circuit as claimed in claim 6, wherein the R, C, $\alpha$, and $\beta$ are determined according to a system frequency of the denoising circuit and noise frequencies.

8. The denoising circuit as claimed in claim 7, wherein the R, C, $\alpha$, and $\beta$ are further determined according to a load capacitor of the load.

9. A touch detection circuit, connecting to a load and configured to detect an impedance variation of the load, the touch detection circuit comprising:
a chip, comprising a first pin and a second pin; and
a denoising circuit, connected between the chip and the load, and comprising:
a first resistor, connected between the first pin of the chip and a first node;
a first capacitor, connected between the first node and a ground voltage;
a second resistor, connected between the second pin of the chip and a second node;
a second capacitor, connected between the first node and the second node;
a third resistor, connected to the second node;
a third capacitor, connected between the third resistor and a driving trace, wherein the driving trace is configured to be connected to the load, which is configured to be touched by a user; and
a shielding metal, surrounding the driving trace but not surrounding the load.

10. The touch detection circuit as claimed in claim 9, wherein the chip further comprises:
a first signal source, configured to output a first signal via the first pin; and
a second signal source, configured to output a second signal via the second pin.

11. The touch detection circuit as claimed in claim 10, wherein the first signal and the second signal are identical sinusoidal signals.

12. The touch detection circuit as claimed in claim 11, wherein
the third resistor has a resistance of R,
the third capacitor has a capacitance of C,
the first resistor has a resistance of $(\alpha+1)R/\beta$,
the first capacitor and the second capacitor respectively has a capacitance of $\beta C$,
the second resistor has a resistance of $\alpha R$, and
the $\alpha$ and the $\beta$ are positive values.

13. The touch detection circuit as claimed in claim 12, wherein the R, C, $\alpha$, and $\beta$ are determined according to a frequency of the sinusoidal signals and noise frequencies.

14. The touch detection circuit as claimed in claim 13, wherein the R, C, $\alpha$, and $\beta$ are further determined according to a load capacitor of the load.

15. The touch detection circuit as claimed in claim 9, wherein
the denoising circuit and the driving trace are arranged on a circuit board, and
the shielding metal is arranged in different layers of the circuit board, and surrounding the driving trace in a length direction of the driving trace to the load.

16. The touch detection circuit as claimed in claim 15, wherein one end of the shielding metal is connected to the first node.

17. The touch detection circuit as claimed in claim 15, wherein the shielding metal arranged in the different layers of the circuit board respectively has a rectangular cross section.

18. The touch detection circuit as claimed in claim 9, wherein the load is an electrode of a vehicle steering wheel or a capacitive touch pad of a computer.

19. A touch detection circuit, connecting to a load and configured to detect an impedance variation of the load, the touch detection circuit comprising:
a chip, comprising a first pin and a second pin respectively configured to output a sinusoidal signal;
a shielding metal;
a shielding branch, connected between the first pin, a ground voltage and the shielding metal, comprising a first resistor connected between the first pin and a first node, and a first capacitor connected between the first node and the ground voltage, and configured to direct noises to the ground voltage;
a driving branch, connected between the second pin and the load, and comprising a second resistor connected between the second pin and a second node, an intermediate capacitor, a third resistor connected to the second node, and a third capacitor connected between the third resistor and a driving trace, wherein the driving trace is connected to the load, wherein the shielding metal surrounds the driving trace but does not surround the load; and
wherein the intermediate capacitor is connected between the first node of the shielding branch and the second node of the driving branch.

20. The touch detection circuit as claimed in claim 19, wherein the load is an electrode of a vehicle steering wheel or a capacitive touch pad of a computer.

* * * * *